(12) United States Patent  (10) Patent No.: US 9,213,754 B1
Zhang et al.  (45) Date of Patent: Dec. 15, 2015

(54) PERSONALIZING CONTENT ITEMS

(71) Applicant: Google Inc., Mountain View, CA (US)

(72) Inventors: Dongmin Zhang, Sunnyvale, CA (US);
Fred Bertsch, Belmont, CA (US);
Jayavel Shanmugasundaram, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 13/716,616

(22) Filed: Dec. 17, 2012

(51) Int. Cl.
*G06F 17/30* (2006.01)

(52) U.S. Cl.
CPC ................. *G06F 17/30595* (2013.01)

(58) Field of Classification Search
CPC ............ G06F 17/30386; G06F 17/30867; G06F 17/30528; G06F 17/30029; G06F 17/30595
USPC ......................................................... 707/736
See application file for complete search history.

(56) References Cited

U.S. PATENT DOCUMENTS

| | | | |
|---|---|---|---|
| 6,285,999 B1 | 9/2001 | Page | |
| 6,853,982 B2 | 2/2005 | Smith et al. | |
| 8,543,422 B2 | 9/2013 | Maman et al. | |
| 8,615,442 B1 | 12/2013 | Kapur et al. | |
| 8,667,563 B1 | 3/2014 | Sandoval | |
| 2003/0106058 A1* | 6/2003 | Zimmerman et al. | 725/46 |
| 2009/0276459 A1* | 11/2009 | Trout et al. | 707/104.1 |
| 2012/0254074 A1* | 10/2012 | Flinn et al. | 706/4 |
| 2013/0332187 A1 | 12/2013 | Maman et al. | |
| 2013/0339155 A1* | 12/2013 | Yerli | 705/14.66 |
| 2014/0006503 A1* | 1/2014 | Serafini et al. | 709/204 |
| 2014/0068455 A1 | 3/2014 | Motgi et al. | |
| 2014/0108518 A1 | 4/2014 | D'Angelo et al. | |

FOREIGN PATENT DOCUMENTS

WO   2013/028516   2/2013

OTHER PUBLICATIONS

Brin and Page, "The Anatomy of a Large-Scale Hypertextual Search Engine," 7th International World Wide Web Conference, Brisbane, Australia, *Computer Networks and ISDN Systems*, 1998, 30:107-117.

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on computer storage media, for personalizing content items. One of the methods includes identifying, by a computer system, a content item to be provided to a client device of a first user. The method includes determining that the content item is capable of including a contextually-related content item associated with a second user, the second user having a relationship of a first user in a social affinity graph. The method includes altering, by the computer system, the content item to include the contextually-related content item. The method includes providing the content item to the client device.

27 Claims, 5 Drawing Sheets

PERSONALIZING CONTENT ITEMS

BACKGROUND

Interactive media (e.g., the Internet) can improve the relevance of content to receptive audiences. For example, some websites provide information search functionality that is based on keywords entered by the user. A user query can be an indicator of the type of information of interest to the user. By comparing the user query to a list of keywords specified by a content provider, it is possible to provide additional relevant content to the user.

Users of social media sites posts pictures, sound recordings, video, and blog posts about their activities. Generally, these pictures sound recordings, videos, and blog posts are of interests to members of their social affinity graph.

SUMMARY

In general, one innovative aspect of the subject matter described in this specification can be embodied in methods that include the actions of identifying, by a computer system, a content item to be provided to a client device of a first user. The methods include the actions of determining that the content item is capable of including a contextually-related content item associated with a second user, the second user having a relationship of a first user in a social affinity graph. The methods include the actions of altering, by the computer system, the content item to include the contextually-related content item. The methods also include the actions of providing the content item to the client device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination the methods may include the actions of selecting the contextually-related content item based on a metric. The metric may include a comparison of a size of the contextually-related content item and a size of an allocated space in the content item. The contextually-related content item may be included in the allocated space. The metric may include a number of recommendations received by the contextually-related content item. The metric may include a measure of the closeness of the relationship between the first user and the second user. The first user and the second user may have a direct relationship in the social affinity graph. The at least one keyword may be associated with both the content item and the contextually-related content item.

Particular embodiments of the subject matter described in this specification can be implemented so as to realize one or more of the following advantages. Content can be personalized to appeal to a user. The appeal of content to the user may be increased. A user is more likely to notice content that is recognizable or includes people known to the user. Interactions with the content may increase. Metrics associated with the performance of content may increase.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user generally has social interests (e.g., interests in the resources about or generated by other people, or otherwise associated with other people) that are different from the social interests of a general population of users. For example, the user can have an interest in resources that are associated with people having a relationship to the user that is reflected in an online social network such people will be referred to collectively as the user's social affinity graph. A picture of people is presumably more interesting to a user if the picture is of the members than if it is of people who have no relationship with the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. A social network site is an online service or platform on the World Wide Web that enables users to build social networks with other users. These social networks can be based on personal or professional relationships, for example. Users of social network sites can post updates and communicate with each other through the site. Social network sites generally include resources, e.g., web pages, that are crawled and indexed by Internet search engines. Such resources, having a uniform resource locator (URL) that includes, as the host name, a domain name associated with the social network site, will be referred to as being located on the social network site.

Content items that appeal to the user's social interests are likely to be more compelling to a user than content items that do not appeal to the user's social interest. In order to make content items more compelling, content items can be altered to include other contextually related content items that have social significance to the user. For example, an advertisement for a product can be altered to include a picture of a user's family member using the product.

Figure 1:
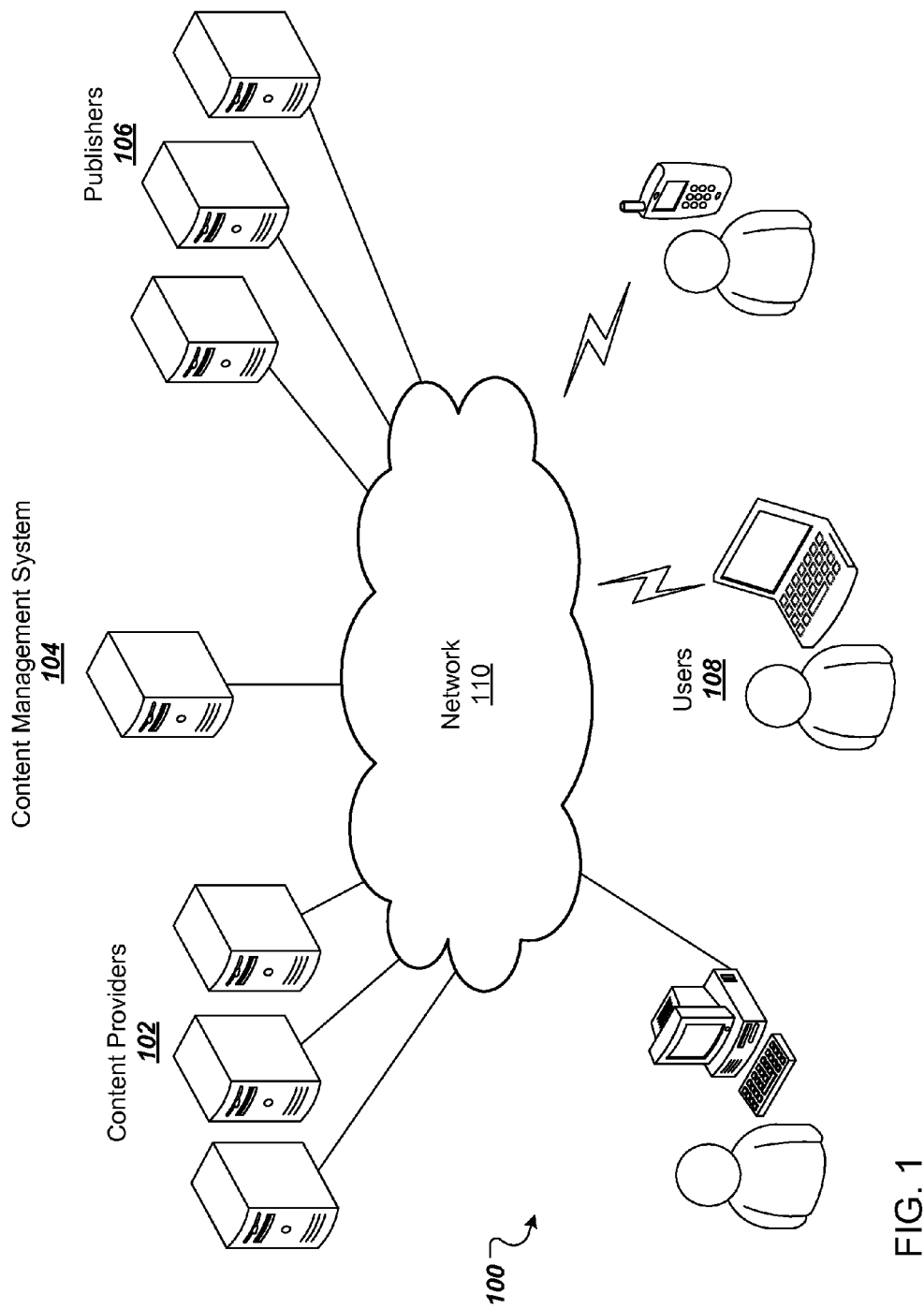
FIG. 1 is a block diagram of an example of an online content delivery system.

FIG. 1 is a block diagram of an example of a online content delivery system 100. In some implementations, one or more content providers (e.g., advertisers) 102 can directly, or indirectly, enter, maintain, and manage content (e.g., advertisement or "ad") information in a content management system 104. Though reference is made in numerous places in this document to advertising, other forms of content, including other forms of sponsored content, can be delivered by the system 100. The content may be in the form of graphical ads, such as banner ads, text only ads, image ads, audio ads, video ads, ads combining one of more of any of such components, etc. The content may also include embedded information, such as a link, meta-information, and/or machine executable instructions. One or more publishers 106 may submit requests for content to the content management system 104. The content management system 104 responds by sending content to the requesting publisher 106 (or directly to an end user) for placement on one or more of the publisher's web properties (e.g., websites or other network-distributed content). The content can include embedded links to landing pages, e.g., pages on the content providers 102 websites, that a user is directed to when the user clicks or otherwise interacts with a content item presented on a publisher website.

A computer network 110, such as a local area network (LAN), wide area network (WAN), the Internet, or a combination thereof, connects the content providers 102, the content management system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server (or a user that is accessing the content source by way of a redirect) may submit a request for one or more content items (e.g., ads) to a content server in the content management system 104. The request may include a number of content items desired. The request may also include content request information. The content request information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the content items provided by the content management system 104. This combined content can be sent to the user 108 that requested the content for presentation in a viewer (e.g., a browser or other content display system). Alternatively, the content can be combined at a user's device (e.g., by combining in a user's browser content from the content source with content items provided by the content management system 104). The content server can transmit information about the content items back to the content server, including information describing how, when, and/or where the content items are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for content items to the content management system 104. The request may include a number of content items desired. This number may depend on the search results, the amount of screen or page space occupied by the search results, the size and shape of the content items, etc. In some implementations, the number of desired content items will be from one to ten, or from three to five. The request may also include the query (as entered or parsed), information based on the query (such as geo-location information, whether the query came from an affiliate and an identifier of such an affiliate), and/or information associated with, or based on, the user or the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores.

The search service can combine the search results with one or more of the content items provided by the content management system 104. This combined information can then be forwarded to the user 108 that requested the content. The search results can be maintained as distinct from the content items, so as not to confuse the user between paid content and presumably neutral search results.

Finally, the search service can transmit information about the content items and when, where, and/or how the content items were rendered back to the content management system 104.

In some examples, the content management system 104 may include an auction process to select content. Content providers (e.g., advertisers) may be permitted to select, or bid, an amount the providers are willing to pay, for example, for interaction with a provided content item (e.g., for each click of an advertisement as a cost-per-click amount an advertiser pays when, for example, a user clicks on an advertisement).

The users 108 may be members of a social affinity graph on a social network site (not shown). The content management system 104 may utilize data from the social network site to provide content items of interest to the users 108, as described below.

Figure 2:
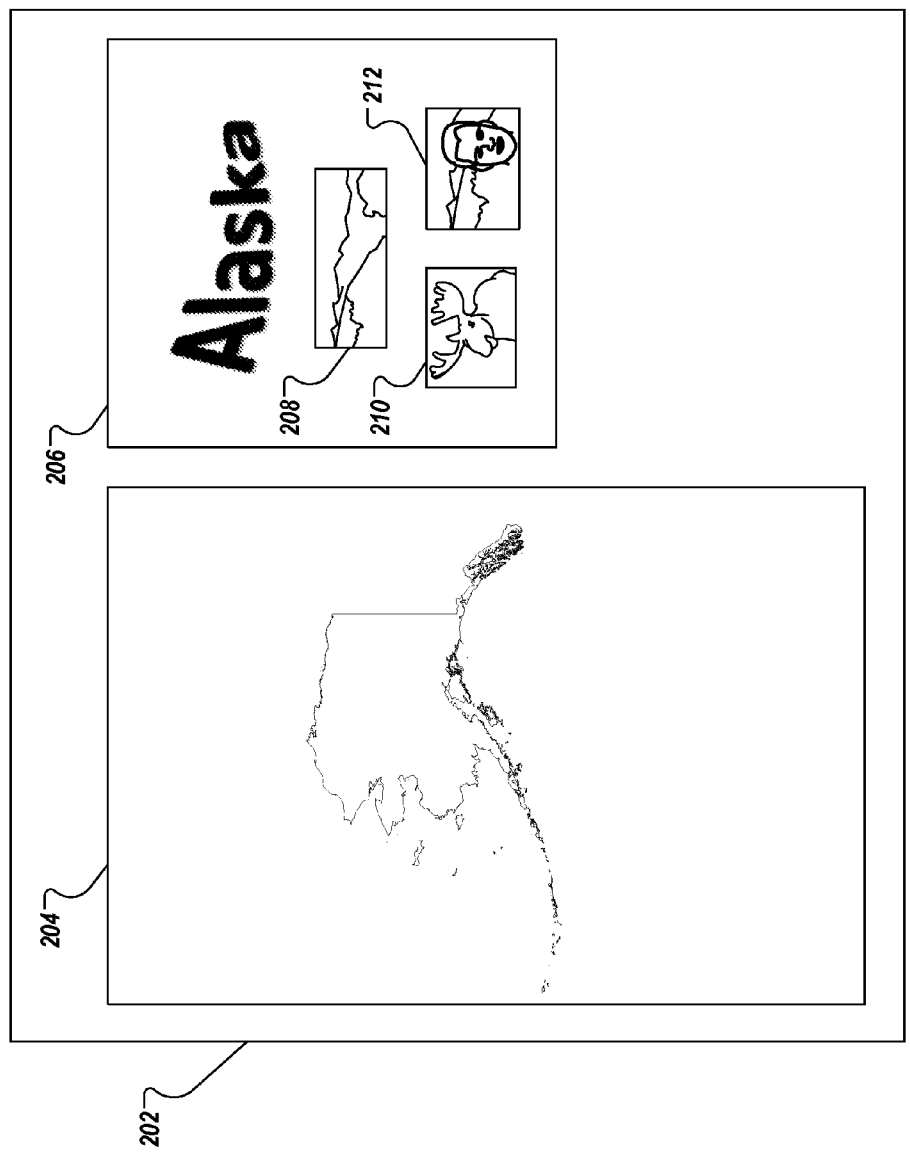
FIG. 2 illustrates an example of a web page that includes personalized content.

FIG. 2 illustrates an example of a web page 202 that includes personalized content 206. The web page 202 is accessed by a user using conventional web browsing software, for example, a web browser on a personal computer, tablet, smartphone, etc. The web page 202 includes content 204 supplied by a publisher and a content item 206 supplied by a content provider. The content item 206 is contextually related to the content 204, for example, the content 204 and the content item 206 may share keywords that describe the content 204 and content item 206 (e.g., Alaska).

The content item 206 can include content, for example, images, sound files, videos, etc. In this example, the content item 206 includes two images provided by the content provider 208 and 210 and personalized content 212. The personalized content 212 is both related to the user accessing the web page and contextually related to the content item 206. The personalized content 212 is an image that is related to the user through a social affinity graph and contextually related to the content item 206. In this example, the personalized content 212 is an image of an acquaintance of the user accessing the web page 202 taken in Alaska.

In some implementations, the content provider may identify a personalized content location of the content item 206 where personalized content may be located, for example, the location of the personalized content 212. The personalized content location may be defined using size dimensions. For example, the personalized content location may allocate 400× 400 pixels of the content item 206 for personalized content. The content provider may provide default content for the personalized content location that is used if personalized content cannot be identified. The content provider may also indicate that one or more of items of default content provided with the content item may be replaced with personalized content.

Figure 3:
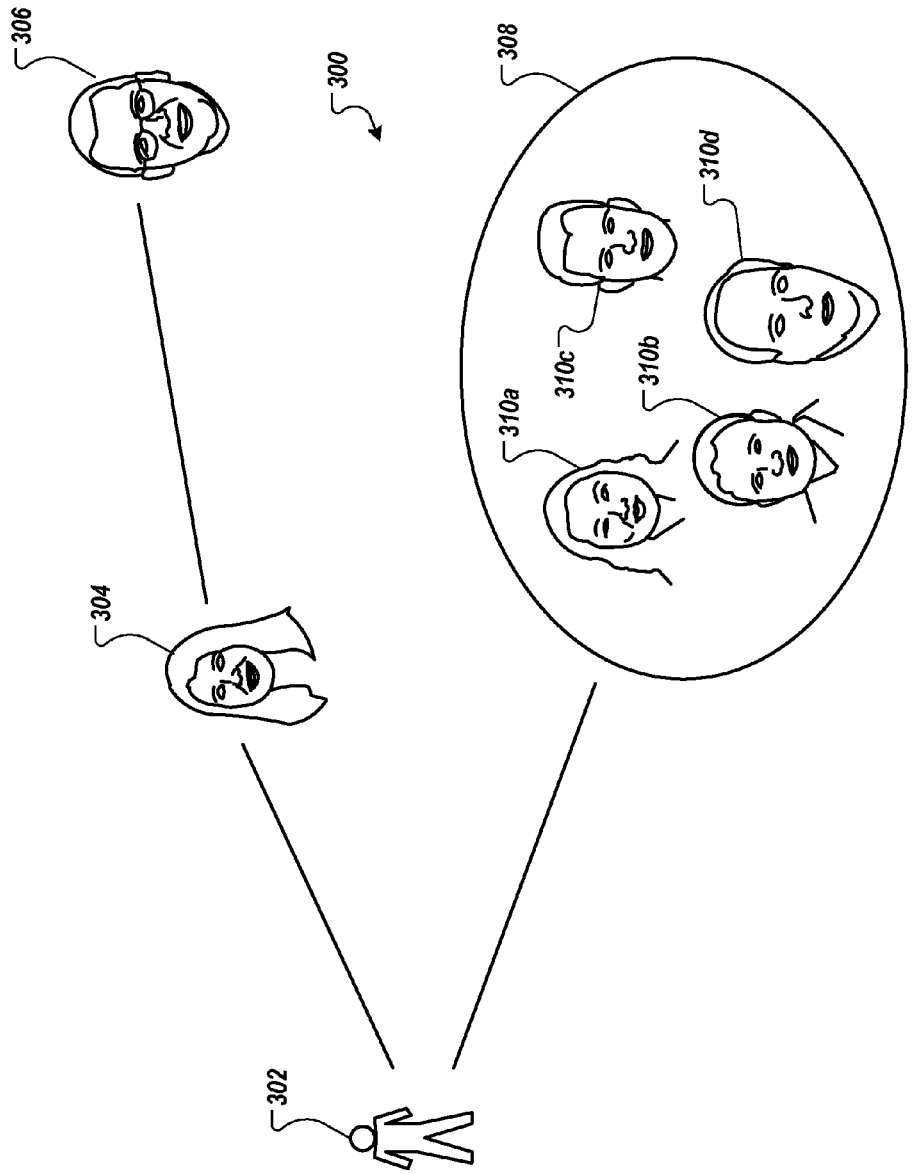
FIG. 3 illustrates an example of a social affinity graph of a user.

FIG. 3 illustrates an example of a social affinity graph 300 of a user 302. Generally, a social affinity graph is a group of other users with whom the user has a relationship known by the social search system. As used in this specification, the term "member" refers to a member of the user's social affinity graph. The social affinity graph of the user includes a first member 304 identified by the user 302. The user 302 can identify the first member 304 in, for example, a user profile. A user profile can include, for example, a list of members of the user's social affinity graph. The user profile can also include information that identifies social network sites in which the user participates.

The social affinity graph 300 of the user 302 also includes a group of members 308 related to the user 302 according to a social network site. In some implementations the user 302 identifies himself as a member of a social network site. With permission from the user 302, the social network site can be examined to identify the members on the social network site (e.g., the members 310a, 310b, 310c, 310d).

The social affinity graph 300 of the user 302 can also include others indirectly related to the user 302. For example, the social affinity graph 300 of the user 302 includes an individual 306 who is indirectly related to the user 302 through the first member 304 of the user. In this example, the both the user 302 and the first member 304 have provided social affinity graph information and granted permission for the social affinity graph information to be used. Generally, users can select whether or not to establish a social affinity graph. Users may also have control over how or whether the social affinity information is used.

The social affinity graph of the user can also include groups of members. For example, the social affinity graph of the user can include a group of co-workers. The group can be defined in the user's user profile based on a place of employment. In some implementations, the user identifies himself as an employee of a company; the user can then be identified with a group of others employed by the same company. In other implementations, the user can identify the co-workers as being members of a group in the user profile. Other groups can also be identified, for example, class mates, fraternity/sorority members, club memberships, professional organizations, social clubs, or fan clubs. In general, a user can select which personal information he or she wishes to be used to establish social affinity graphs. For example, one user may elect to use high school as a membership criterion for social affinity graphs and another user may elect not to use high school as a membership criterion for a social affinity graphs. In this example, the first user may be associated with other users who attended the same high school and also selected to use high school as a membership criterion.

The social affinity graph can also include others who have other relationships with the user. For example, in some implementations, a social affinity graph of the user can include the contributors to blogs or micro-blogs to which the user subscribes. In some implementations, a social affinity graph of the user can include others with whom the user has had email correspondence, others identified in the users address book, and others in an instant messaging contact list.

Figure 4:
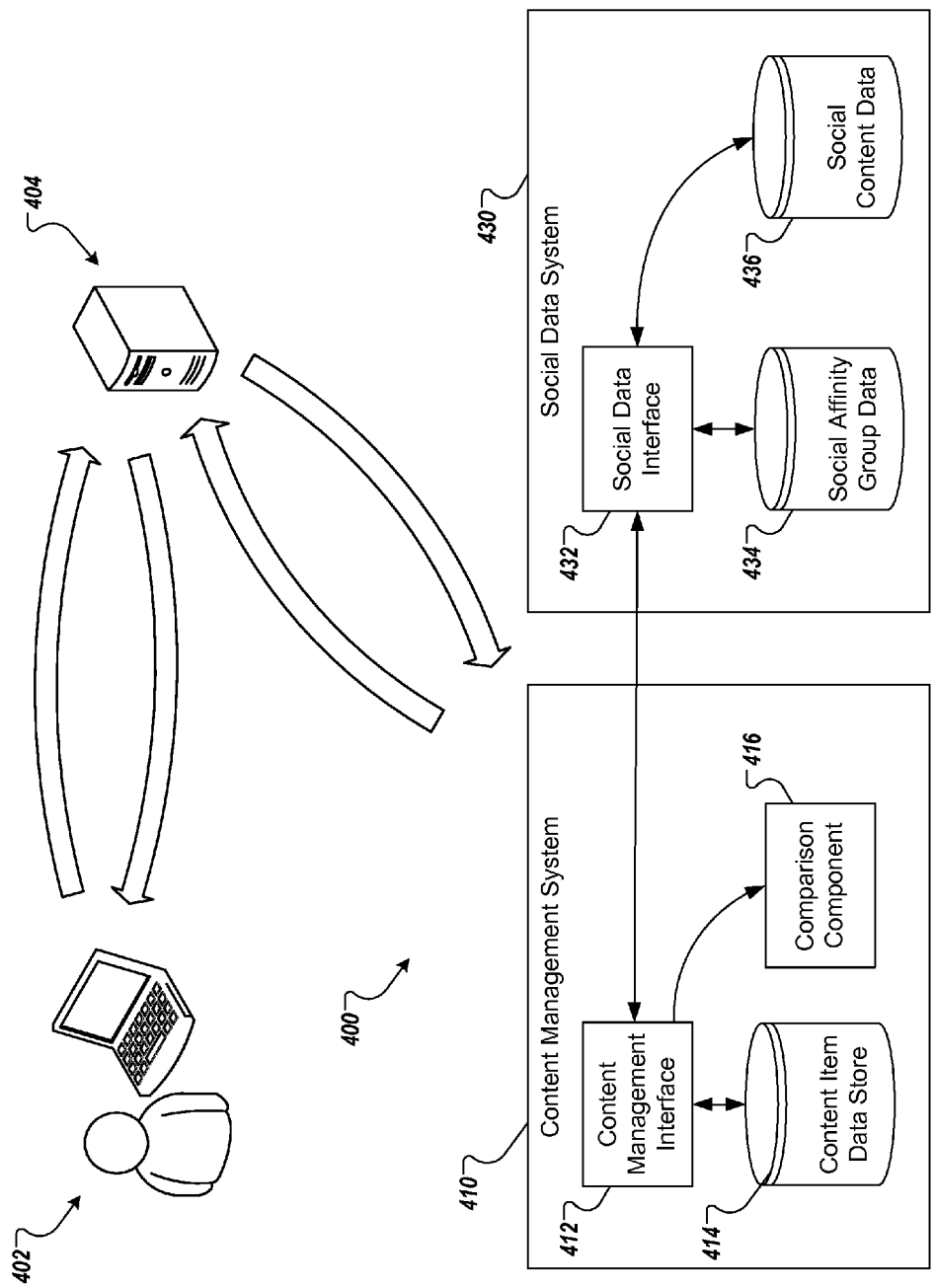
FIG. 4 illustrates an example of a system for delivering personalized contents.

FIG. 4 illustrates an example of a system 400 for delivering personalized contents. A user of a client device 402 requests content from a publisher 404. The publisher requests a content item from a content management system 410. In some implementations, the publisher 404 provides the requested content to the user 402 and the user 402. The requested content may include instructions, such as a Hyper Text Markup Language (HTML) redirect, that cause the client device 402 to request the personalized content from the content management system.

A content management interface 412 of the content management system 410 receives the request for the personalized content. The request may include, among other information, the identity of the user of the client device 402, one or more keywords that are associated with the content (for example, a name of location, a name of a product, or other descriptive term), and/or a location (for example, a zip code, global positioning system (GPS) coordinates, or a name of a city). The content management interface 412 identifies a content item in a content item data store 414. The content item may be identified by using the keywords and location information included in the request.

The content management interface 412 identifies that the content item has been designated as capable of supporting personalization. In some implementations, the content item is associated with information about how the content item may be personalized. For example, the size of the personalization location may be specified. In some implementations, a content provider associated with the content item may specify the type of content that may be included in the advertisement, for example, the content provider may limit the personalized content to images and/or video. In some implementations, the content management system 410 identifies a location based on the keywords, for example, the keyword "Alaska" corresponds to the geographic area of the state of Alaska.

The content management interface 412 requests personalized content from a social data interface 432 on a social data system 430. The social data system stores social affinity graph data 434. The social affinity graph data 434 may be used by the social data system 430 to identify members of the user's 402 social affinity graph and the relationships between the user 402 and the members. The social data system also includes social content data 436. The social content data includes content items associated with the members of a social affinity graph. This content items may include, but are not limited to, image files, video files, sound files, blog and micro-blog posts, reviews, etc.

Each of the content items may be associated with meta-data describing the content item. For example, a content item may be associated with content subject matter information, location information, and quality information. In some implementations, meta-data about the content item may be determined from meta-data associated with related content items, for example, a series of images uploaded to a social network site by a user in a short period of time (for example, 5 minutes, 10 minutes, 1 hour) are likely to share common content subject matter.

Content subject matter information can include information describing the subject of the content. For example, a content item may be associated with the other people, places, things, or activities found in the content item, content subject matter information are words and phrases that describe those people, places, things, or activities.

Content subject matter information can include keyword and tags associated with the content item. Keywords can be provided by the user either explicitly (for example a tag "Alaska"), or identified from other information associated with the content item, for example a title (for example, "Our family at Mt. McKinley, Alaska", or comments about the content item (for example, "It looks like you had a great time in Alaska").

Keywords can also be derived from the content, for example, image recognition techniques may be used to identify landmarks or products, semantic analysis techniques can be used to identify the subject of a blog post.

Location information can include GPS coordinates, names of landmarks (e.g. "Mr. McKinley"), or names of geopolitical regions (e.g. towns, cities, states). The location information can be provided be the user, either expressly or through automatically provided GPS information, or may be derived from the content item. For example, once image recognition techniques identify a landmark, the location of that landmark is known. Locations can also be derived from related information, for example, a caption on a photograph may identify where the picture was taken. Quality information can include metrics representative of the quality of the content. For example, quality information can include a number of times other users have recommended the content (e.g. gave the content a "+1") or the number of comments that include positive words compared to the number of comments containing negative words. In some implementations, the quality information for content may be derived based on the quality information for other content by the same user, for example, if a user consistently provides images of high quality, it is likely that an image by the user is of high quality. Quality information can also include a determination of whether if an image is in focus and/or has sufficient contrast. Quality information can also include a determination of whether individuals in a photograph clearly visible, for example by using facial recognition.

The social data interface 432 obtains social content data that meets criteria specified in the request. For example, the request may specify a type of content item, a minimum size of the content item keyword, associated with the content item, and the identity of the user. The social data interface 432 searches the social affinity graph data 434 and social content data 436 to identify content items created by users who are related to the user in the social affinity graph data 434. The social data system 430 may restrict the search of content items based on the social affinity graph data 434. For example, content items may be restricted based on a maximum threshold degree of separation between the user and the creator of the content. For example, the social data interface 432 may restrict the search of the social content data to content created by users who are directly related to the user in the social affinity graph data 434, or to users who have second degree relationships (e.g., users related to users related to the user). In some implementations, content items may be restricted based on the social relationship between the user and the member of the user's social affinity graph, for example, content items from friends and family may be included while content items from co-workers may be excluded.

The selected content items are provided to the content management system 410.

The content management system 410 selects the content item from the social data system 430 to include in the personalized content. In some implementations, the content management system 410 selects personalized content based on the closeness of the relationship between the user and the user associated with the personalized content and the applicability of the content item to the personalized content, the user and the creator of the content item, and the quality of the content item. In some implementations, the personalized content is compared to the size allocated for personalized content, for example, a social content item may not be selected if it is smaller than the size available, as enlargement often reduces quality.

Figure 5:
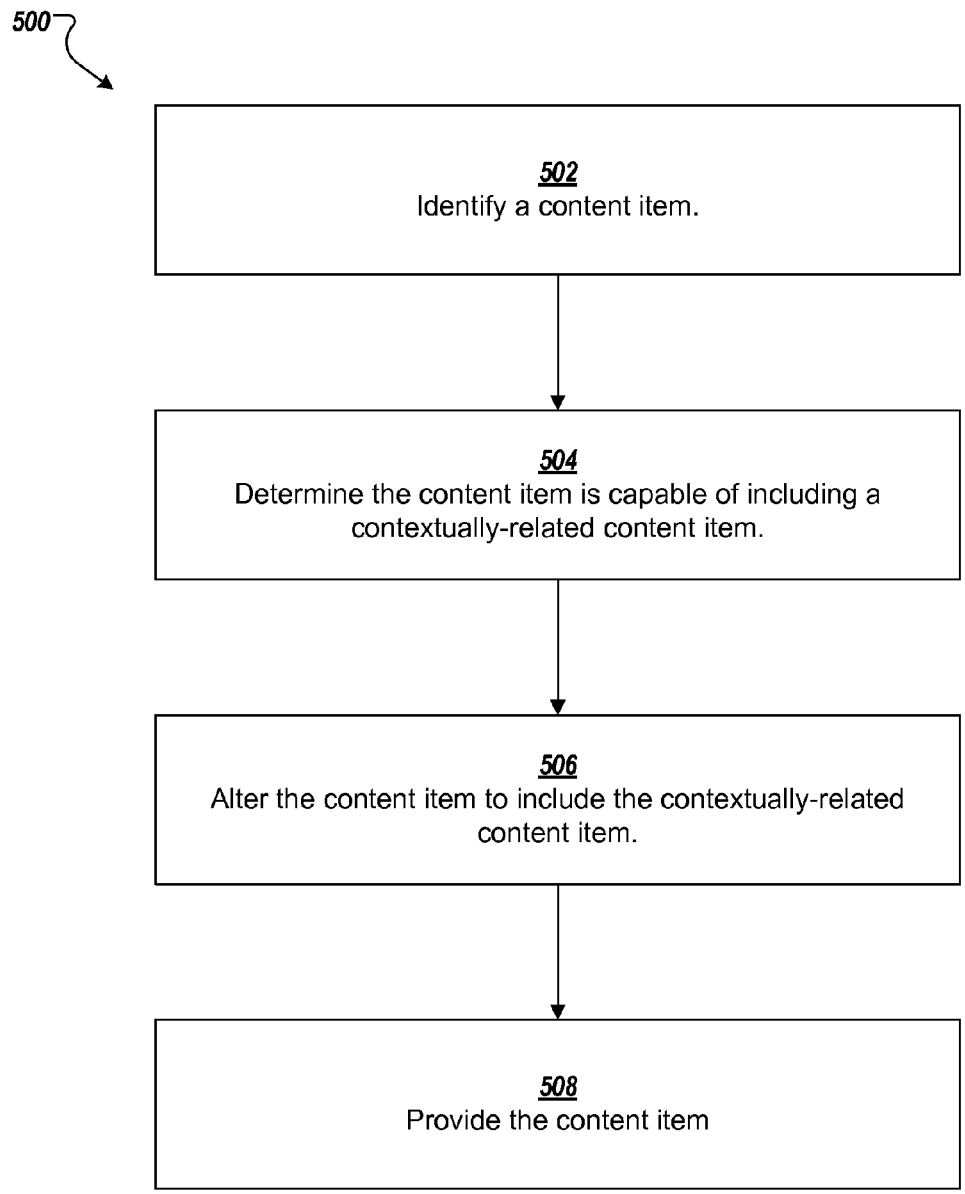
FIG. 5 is a flow chart of an example of a process for personalizing content items.

FIG. 5 is a flow chart of an example of a process 500 for personalizing content items. The process 500 may be implemented by a content management system, for example, the content management system 104 of FIG. 1. For simplicity, the process will be described in terms of a system implementing the process.

A content item is identified (502). The content item may be identified by a content management system. In some implementations, the content item is identified by comparing keywords associated with a web page, search query, or search results with keywords associated with the content item.

The content item may be identified in response for a content item to present to a user. The request may originate from a client device or a publisher (for example, the publishers 106 of FIG. 1).

That the content item is capability of including a contextually-related content item is determined (504). A content provider may indicate that a content item is capable of including contextually-related content (for example, may include personalized content). The content item may be associated with meta-data that describes the permissible contextually-related content including a location and size of the contextually-related content. In some implementations, the content provider may specify keywords which can be used to identify appropriate contextually-related content. In other implementations, keywords used to identify the content item can be used to identify contextually-related content. The content provider may provide a default content item for use if an appropriate contextually-related content item cannot be identified. The contextually-related content is associated with a second user related to the user in a social affinity graph (for example, the users may be related on a social networking site.)

The contextually-related content item can be selected based on a variety of metrics, including, but not limited to, the size of the contextually-related content item, the size of a space allocated for the contextually-related content item in the content item, a number of recommendations received by the contextually-related content item, and keywords associated with the contextually-related content item.

The content item is altered to include the contextually-related content item (506). In some implementations, an HTML hyperlink that references the contextually-related content item is embedded in the content item. When the content item is presented on a client device a conventional web browser obtains the contextually related content item from the content management system.

The content item may include the contextually-related content item in other ways. For example, the contextually-related content item may be rendered in a video or integrated into a multimedia presentation or animation.

The content item is provided to the client device (508). The content item can be provided as a response to the request by the client device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments of the subject matter disclosed herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying, by a computer system, a first content item to be provided to a client device of a first user;
   determining, by the computer system, that the first content item is capable of including a second content item that is contextually-related to the first content item;
   sending, by the computer system, a request to a social data system, the request comprising one or more criteria, and the social data system storing content items associated with members of a social network, and social affinity data representing connections among the members of the social network, the members of the social network including the first user and a second user;
   receiving, by the computer system, a social affinity graph of the first user, the social affinity graph defining a social connection between the first user and the second user, and the social affinity graph being based on input, from each of the first user and the second user, that identifies information represented by social affinity data to use in creating the social affinity graph;
   receiving, by the computer system and in response to the request, one or more candidate content items having criteria that match the one or more criteria, the one or more candidate content items having been created by one or more members of the social network who are in the social affinity graph of the first user;
   selecting, by the computer system, the second content item, from among the one or more candidate content items, the second content item having been created by the second user;
   altering, by the computer system, the first content item to include the second content item; and
   providing, by the computer system, the first content item, which has been altered to include the second content item, to the client device.

2. The method of claim 1, wherein the second content item is selected based on one or more metrics.

3. The method of claim 2, wherein the one or more metrics includes a size of the second content item and a size of an allocated space in the first content item, wherein the second content item is to be included in the allocated space.

4. The method of claim 2, wherein the one or more metrics includes a number of recommendations received by the second content item.

5. The method of claim 2, wherein the one or more metrics includes a measure of closeness of a relationship between the first user and the second user in the social network.

6. The method of claim 5, wherein the first user and the second user have a direct connection in the social network.

7. The method of claim 1, wherein at least one keyword included in the one or more criteria is associated with both the first content item and the second content item.

8. The method of claim 1, wherein the first content item comprises code for requesting the second content item that is contextually-related to the first content item.

9. The method of claim 8, wherein the request to the social data system is sent through execution of the code.

10. One or more non-transitory machine-readable storage devices storing instructions that are executable by one or more processing devices to perform operations comprising:
   identifying a first content item to be provided to a client device of a first user;
   determining that the first content item is capable of including a second content item that is contextually-related to the first content item;
   sending a request to a social data system, the request comprising one or more criteria, and the social data system storing content items associated with members of a social network, and social affinity data representing connections among the members of the social network, the members of the social network including the first user and a second user;
   receiving a social affinity graph of the first user, the social affinity graph defining a social connection between the first user and the second user, and the social affinity graph being based on input, from each of the first user and the second user, that identifies information represented by social affinity data to use in creating the social affinity graph;
   receiving, in response to the request, one or more candidate content items having criteria that match the one or more criteria, the one or more candidate content items having been created by one or more members of the social network who are in the social affinity graph of the first user;
   selecting the second content item, from among the one or more candidate content items, the second content item having been created by the second user;
   altering the first content item to include the second content item; and
   providing the first content item, which has been altered to include the second content item, to the client device.

11. The one or more non-transitory machine-readable storage devices of claim 10, wherein the operations comprise selecting the second content item based on one or more metrics.

12. The one or more non-transitory machine-readable storage devices of claim 11, wherein the one or more metrics includes a size of the second content item and a size of an allocated space in the first content item, wherein the second content item is to be included in the allocated space.

13. The one or more non-transitory machine-readable storage devices of claim 11, wherein the one or more metrics includes a number of recommendations received by the second content item.

14. The one or more non-transitory machine-readable storage devices of claim 11, wherein the one or more metrics includes a measure of closeness of a relationship between the first user and the second user in the social network.

15. The one or more non-transitory machine-readable storage devices of claim 14, wherein the first user and the second user have a direct connection in the social network.

16. The one or more non-transitory machine-readable storage devices of claim 10, wherein at least one keyword included in the one or more criteria is associated with both the first content item and the second content item.

17. The one or more non-transitory machine-readable storage devices of claim 10, wherein the first content item comprises code for requesting the second content item that is contextually-related to the first content item.

18. The one or more non-transitory machine-readable storage devices of claim 17, wherein the request to the social data system is sent through execution of the code.

19. A system comprising:
one or more computers; and
one or more storage devices storing instructions that are executable by the one or more computers to cause the one or more computers to perform operations comprising:
identifying a first content item to be provided to a client device of a first user;
determining that the first content item is capable of including a second content item that is contextually-related to the first content item;
sending a request to a social data system, the request comprising one or more criteria, and the social data system storing content items associated with members of a social network, and social affinity data representing connections among the members of the social network, the members of the social network including the first user and a second user;
receiving a social affinity graph of the first user, the social affinity graph defining a social connection between the first user and the second user, and the social affinity graph being based on input, from each of the first user and the second user, that identifies information represented by social affinity data to use in creating the social affinity graph;
receiving, in response to the request, one or more candidate content items having criteria that match the one or more criteria, the one or more candidate content items having been created by one or more members of the social network who are in the social affinity graph of the first user;
selecting the second content item, from among the one or more candidate content items, the second content item having been created by the second user;
altering the first content item to include the second content item; and
providing the first content item, which has been altered to include the second content item, to the client device.

20. The system of claim 19, wherein the second content item is selected based on one or more metrics.

21. The system of claim 20, wherein the one or more metrics includes a size of the second content item and a size of an allocated space in the first content item, wherein the second content item is to be included in the allocated space.

22. The system of claim 20, wherein the one or more metrics includes a number of recommendations received by the second content item.

23. The system of claim 20, wherein the one or more metrics includes a measure of closeness of a relationship between the first user and the second user in the social network.

24. The system of claim 23, wherein the first user and the second user have a direct connection in the social network.

25. The system of claim 19, wherein at least one keyword included in the one or more criteria is associated with both the first content item and the second content item.

26. The system of claim 19, wherein the first content item comprises code for requesting the second content item that is contextually-related to the first content item.

27. The system of claim 26, wherein the request to the social data system is sent through execution of the code.

* * * * *